United States Patent
Beier et al.

(10) Patent No.: US 9,018,806 B2
(45) Date of Patent: Apr. 28, 2015

(54) GENERATOR AND ACCESSORY GEARBOX DEVICE WITH A GENERATOR

(75) Inventors: Juergen Beier, Schulzendorf (DE); Soeren Braun, Zeuthen (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 363 days.

(21) Appl. No.: 13/593,056

(22) Filed: Aug. 23, 2012

(65) Prior Publication Data

US 2013/0057093 A1    Mar. 7, 2013

(30) Foreign Application Priority Data

Sep. 2, 2011    (DE) .......................... 10 2011 112 252

(51) Int. Cl.
| | |
|---|---|
| *H02K 9/00* | (2006.01) |
| *H02K 9/04* | (2006.01) |
| *F01D 15/10* | (2006.01) |
| *H02K 5/128* | (2006.01) |
| *F02C 7/32* | (2006.01) |
| *H02K 9/02* | (2006.01) |

(52) U.S. Cl.
CPC ...... *F01D 15/10* (2013.01); *H02K 9/00* (2013.01); *H02K 5/128* (2013.01); *H02K 5/1282* (2013.01); *H02K 9/04* (2013.01); *H02K 9/02* (2013.01); *H02K 2005/1287* (2013.01); *F02C 7/32* (2013.01)

(58) Field of Classification Search
CPC ............ H02K 5/128; H02K 5/1282; H02K 2005/1287; H02K 9/00; H02K 9/02; H02K 9/04; F02C 7/32; F01D 15/10
USPC ............................. 310/43, 52, 54, 58, 87, 88
IPC .................................................. H02K 9/00,9/04
See application file for complete search history.

(56) References Cited

U.S. PATENT DOCUMENTS

| | | | | |
|---|---|---|---|---|
| 3,068,371 | A * | 12/1962 | Galtz .............................. | 310/87 |
| 3,101,423 | A * | 8/1963 | Brunot ............................ | 310/86 |
| 3,143,676 | A * | 8/1964 | Niemkiewicz .................. | 310/86 |
| 3,444,403 | A * | 5/1969 | Macha ............................ | 310/86 |
| 4,335,323 | A * | 6/1982 | Kebbon et al. ............. | 310/40 R |
| 5,923,108 | A * | 7/1999 | Matake et al. .................. | 310/89 |
| 6,359,353 | B1 * | 3/2002 | Bevington ...................... | 310/87 |

(Continued)

FOREIGN PATENT DOCUMENTS

| | | |
|---|---|---|
| DE | 60221614 | 11/2007 |
| DE | 102008061275 | 9/2009 |

OTHER PUBLICATIONS

German Search Report dated Jun. 14, 2012 from counterpart application.

*Primary Examiner* — John K Kim
(74) *Attorney, Agent, or Firm* — Timothy J. Kilma; Shuttleworth & Ingersoll, PLC

(57) ABSTRACT

The present invention proposes a generator for arrangement on a shaft of an accessory gearbox of an engine with a stator and with a rotor which can be coupled to a shaft of the accessory gearbox of the engine and which is rotatably mounted relative to the stator, where a stator area receiving the stator can be separated from a rotor area receiving the rotor. The rotor can be supplied with cooling medium in the rotor area. It furthermore proposes an accessory gearbox of an engine with a drive shaft operatively connectable to a main shaft of the engine and with at least one generator arranged on a shaft of the accessory gearbox.

13 Claims, 4 Drawing Sheets

(56) References Cited

U.S. PATENT DOCUMENTS

Figure 1:
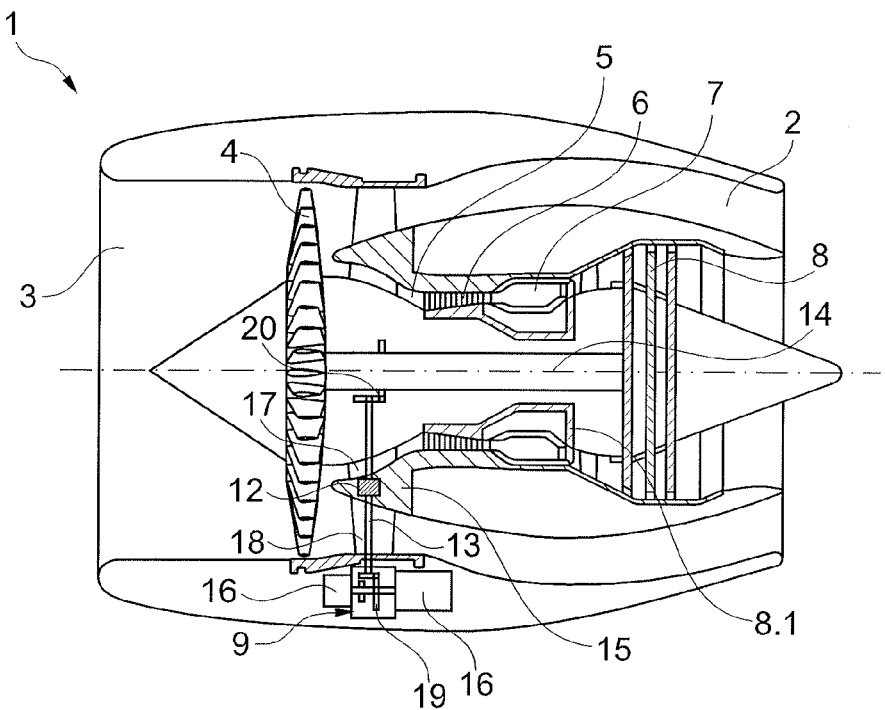

| | | | |
|---|---|---|---|
| 6,515,383 B1 * | 2/2003 | Ognibene et al. | 310/52 |
| 6,861,777 B2 * | 3/2005 | Kimberlin et al. | 310/87 |
| 6,933,633 B2 | 8/2005 | Kaneko et al. | |
| 6,960,856 B2 * | 11/2005 | Reimann | 310/156.28 |
| 8,013,488 B2 | 9/2011 | Berenger et al. | |
| 2002/0180284 A1 * | 12/2002 | LeFlem et al. | 310/54 |
| 2006/0137355 A1 * | 6/2006 | Welch et al. | 60/772 |
| 2006/0250037 A1 * | 11/2006 | Kummlee | 310/88 |
| 2010/0156113 A1 * | 6/2010 | Lemmers, Jr. | 290/1 |
| 2010/0327589 A1 | 12/2010 | Macchia | |
| 2013/0057093 A1 * | 3/2013 | Beier et al. | 310/52 |

* cited by examiner

GENERATOR AND ACCESSORY GEARBOX DEVICE WITH A GENERATOR

This application claims priority to German Patent Application DE102011112252.8 filed Sep. 2, 2011, the entirety of which is incorporated by reference herein.

This invention relates to a generator for arrangement on a shaft of an accessory gearbox and to an accessory gearbox.

Generators, for example so-called permanent magnet alternators (PMAs), are known from practice and are used as an independent power source for supplying power to an engine control system. The generators are assigned to an accessory gearbox and have a rotor driven by a shaft of the accessory gearbox and rotatable therewith, and a stationary stator. The generator is connected by a casing holding the stator, for example by bolt connections, to a casing of the accessory gearbox.

During operation of the engine, the shaft on which the generator is arranged is driven at high speeds. This results during power generation in high temperatures in the region of a stator of the generator. To ensure correct functioning of the generator, the thermal energy must be removed from the generator. This is achieved on the one hand in the area of a stator casing by heat exchange with the environment, which however does not provide adequate cooling. On the other hand, the generator is also cooled in the area of a shaft. The shaft is to that end designed as a hollow shaft and has for example a cooling fluid flowing through it on the inside via an oil nozzle.

The cooling additionally provided in the area of the shaft is disadvantageously also insufficient to operate the generator in its optimum temperature range. This results from the fact that the heat generated by the generator is greatest in the area of the stator, and cooling via the hollow shaft is at too great a distance from the stator area.

Furthermore, generators are known in engine construction which are designed for supplying power to an entire aircraft and have correspondingly large dimensions. To achieve a sufficient cooling effect here, these generators have an integrated cooling circuit by which the heat building up particularly in the area of the stator can be removed. The cooling circuit here includes lines which, among others, run through the stator. The proximity of cooling to the heat source makes this very effective. However, the design of a cooling circuit of this type is very complex and its implementation is correspondingly cost-intensive.

The object underlying the present invention is to provide a generator of simple design and effectively temperature-controllable for arrangement on a shaft of an accessory gearbox of an engine, and an accessory gearbox having such a generator.

A generator designed in accordance with the present invention for arrangement on a shaft of an accessory gearbox of an engine is designed with a stator and with a rotor which can be coupled to a shaft of the accessory gearbox of the engine and which is rotatably mounted relative to the stator. It is proposed in accordance with the invention that a stator area receiving the stator can be separated from a rotor area receiving the rotor, where the rotor in the rotor area can be supplied with cooling medium.

Since cooling of the generator near to the stator can be achieved with cooling medium, the generator in accordance with the invention can be temperature-controlled or cooled more effectively in comparison to solutions known from practice, and hence it can be operated at its optimum temperature range at least approximately over the entire operating range. Hence it is possible using the generator in accordance with the invention to provide a required power output at any time. Furthermore, service life of the generator is higher when compared to known solutions due to the lower temperature loads.

In a generator in accordance with the invention, rotor washing with the cooling medium and permitting effective cooling in the axial direction of the generator is achievable and can be represented with a required flow profile with low flow losses occurring at the same time.

Due to the separation of the stator area from the rotor area, lines of complex design and causing high manufacturing costs, as used in separate cooling circuits, can be dispensed with.

A complete sealing of the stator area, representing a dry area, from the rotor area, representing a wet area, can be achieved with simple means, whereas in known generators minor quantities of oil can enter through the oil separators provided for separation of the dry area. The separation in accordance with the invention of the rotor area from the stator area, or the encapsulation of the stator area, advantageously ensures that the cooling medium does not come into contact with electric components of the stator area.

If the rotor is made from a material which tends to corrode under the effect of the environment, the rotor is exposed to lesser corrosion during operation of the generator by the selection of a suitable cooling medium.

The generator can for example be designed for power supply to an engine control system or for power supply to an entire aircraft by dimensioning it commensurately with the respective application.

In a simply designed embodiment of the generator in accordance with the invention, a separator element extending between the stator and the rotor is provided for separation of the stator area from the rotor area. Since the separator element does not have to perform any additional functions immanent to a structural component, it can be designed with small dimensions. The separator element can accordingly be designed very thin, so that a distance between the stator and the rotor, which plays a crucial role for the effectivity of the generator, can be kept very low. Possible losses caused by the only slightly increased distance between the rotor and the stator of the generator due to the separator element when compared with conventional generators can if necessary be compensated for in simple manner by a minor increase in a magnetic field strength or by an increase in the rotor speed in comparison to a conventional generator without separator element.

To minimize any effect of the separator element on the effectiveness of the generator, the separator element is, in an advantageous embodiment of the invention, made from a non-magnetic material.

The separator element is, in a simply designed embodiment of the generator in accordance with the invention, designed as a separate component which can be connected via fastening elements to a casing, in particular to a stator casing of the generator. A material of the separator element can in this embodiment be advantageously selected regardless of a material of the casing. The separator element can for example be fixed to the casing using pins, bolts or similar.

In an alternative embodiment of the invention, the separator element is designed integral with a casing of the generator, so that unlike in the design of the separator element separate from the casing no fastening elements need to be provided to connect the separator element to the casing.

In an advantageous embodiment of the invention, the generator has a cooling unit which supplies the rotor area of the generator with the cooling medium. Alternatively to this, the generator only has connections for routing of the cooling medium, which can be coupled in particular to a cooling system of the accessory gearbox or of the entire engine.

To permit exchangeability of at least the more maintenance-intensive components of the generator in a simple manner, at least one casing of the generator and the stator can be designed detachable from the shaft, where the casing of the generator and the stator are to that end designed in at least two parts in the circumferential direction. In addition to this, the separator element and if necessary the rotor can also be designed split in a similar way and detachable together with the casing of the generator and the stator from the respective shaft. By this measure, the generator, or at least the detachable parts thereof, can in the case of arrangement on various shafts of the accessory gearbox be simply and quickly detached from or arranged on the shaft, for example for repair and maintenance work.

The generator is, in a simply designed embodiment of the invention, designed in two parts, where said two parts on the one hand can be coupled to one another by a hinged connection and on the other hand connected to one another by a locking connection for fixing onto a shaft of the accessory gearbox. A replacement of the parts of the generator by means of a sleeve-like hinged/locking connection of this type is possible in a particularly simple manner.

Alternatively or additionally to this, the parts of the generator can be fixed on a shaft of the accessory gearbox by means of at least one fastening device gripping around the casing of the generator on the circumferential side. The fastening device can in particular represent a quick-action lock and for example be designed as a so-called V-band clip. The replaceable parts of the generator can as a result be completely separated from one another.

The generator in accordance with the invention can be designed for arrangement in the area of an end section of a shaft of the engine's accessory gearbox, where the end section of the shaft is arranged completely inside a casing of the generator. This design of the generator is intended for example for arrangement of the generator on an accessory gearbox shaft provided specifically for the generator.

In an alternative embodiment of the invention, the generator is designed for arrangement on a continuous shaft of the accessory gearbox of the engine in the area of the generator. This embodiment of the generator permits its arrangement in particular also on shafts on which other units are arranged in addition. With an appropriate design of the generator, the latter is easily detachable from the continuous shaft, in particular for repair and maintenance work. The generator can be linked by its casing to adjacent casings of the accessory gearbox.

An engine's accessory gearbox in accordance with the invention is designed with a drive shaft operatively connectable to a main shaft of the engine and with at least one generator in accordance with the invention arranged on a shaft of the accessory gearbox. The accessory gearbox has a simply designed generator that can be effectively temperature-controlled. This results from the generator being subjected to cooling medium in an area close to the stator in which the greatest heat is generated.

In an advantageous embodiment of an accessory gearbox in accordance with the invention, a casing of the accessory gearbox, in particular a casing of a drive shaft adjacent to the generator arranged on the shaft, is designed in one piece with the separator element of the generator.

The generator can, in an accessory gearbox in accordance with the invention, be arranged on all shafts of the accessory gearbox. It is particularly advantageous when the generator is arranged on a shaft in the area of an intermediate casing of the engine or on a shaft in the area of an engine casing arranged in the radial direction outside a bypass duct.

In an advantageous embodiment of the invention, the accessory gearbox has a cooling unit which supplies the rotor area of the generator with the cooling medium. The cooling unit can be part of the generator or only designed for supplying the cooling medium to the generator.

Both the features stated in the patent Claims and the features stated in the following exemplary embodiments of the generator in accordance with the invention and of the accessory gearbox in accordance with the invention, are each suitable, singly or in any combination with one another, to develop the subject matter of the invention. The respective feature combinations do not represent any restriction with regard to the development of the subject matter in accordance with the invention, but have substantially only exemplary character.

Figure 4:
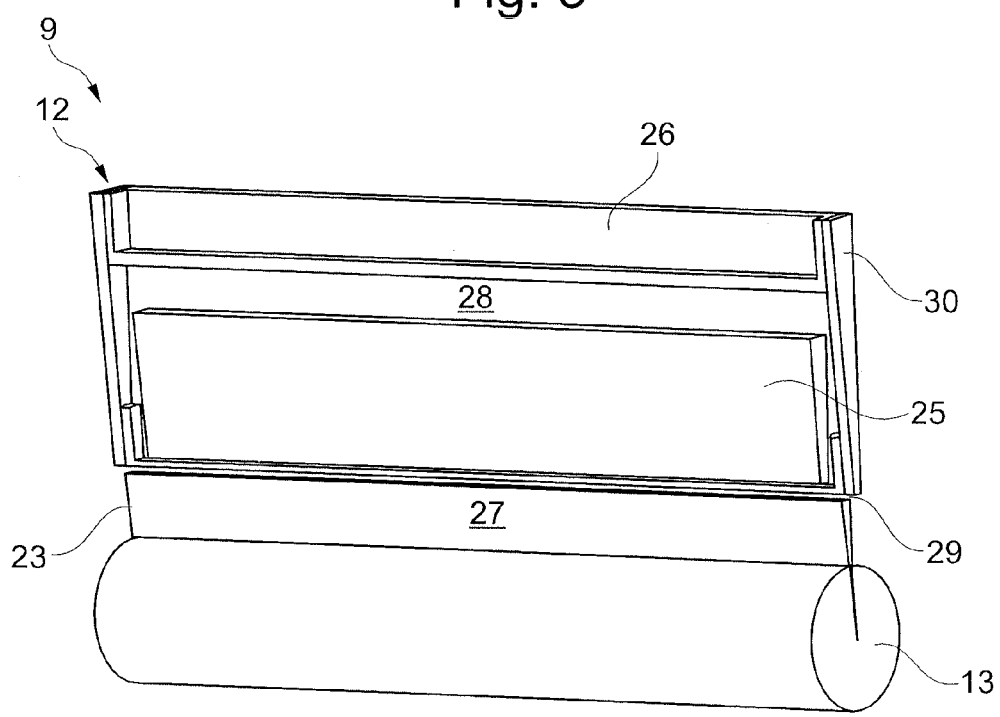
Figure 5:
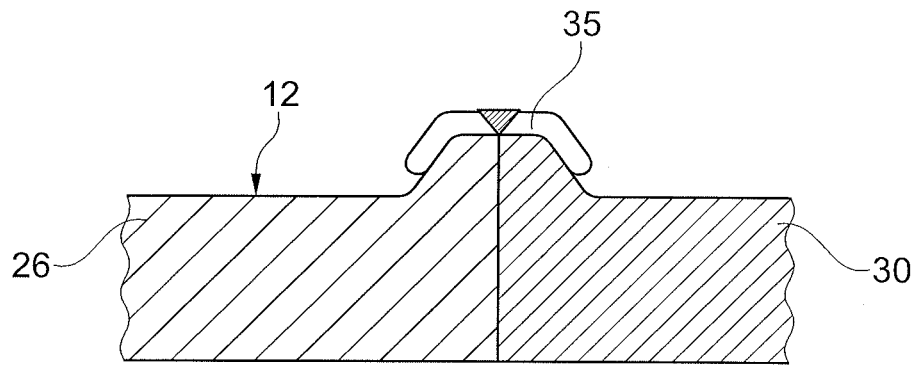
Figure 6:
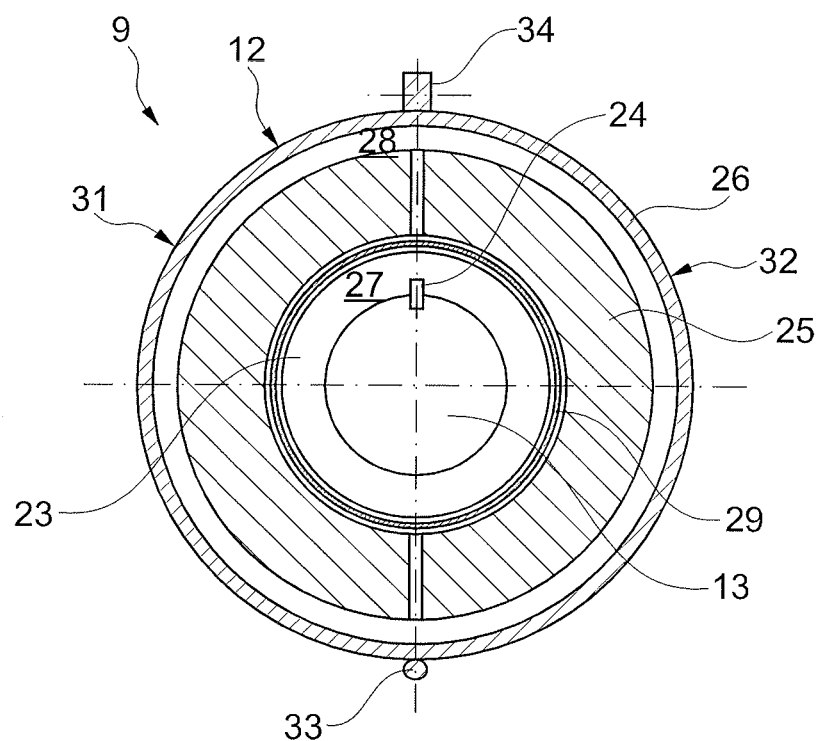
Figure 7:
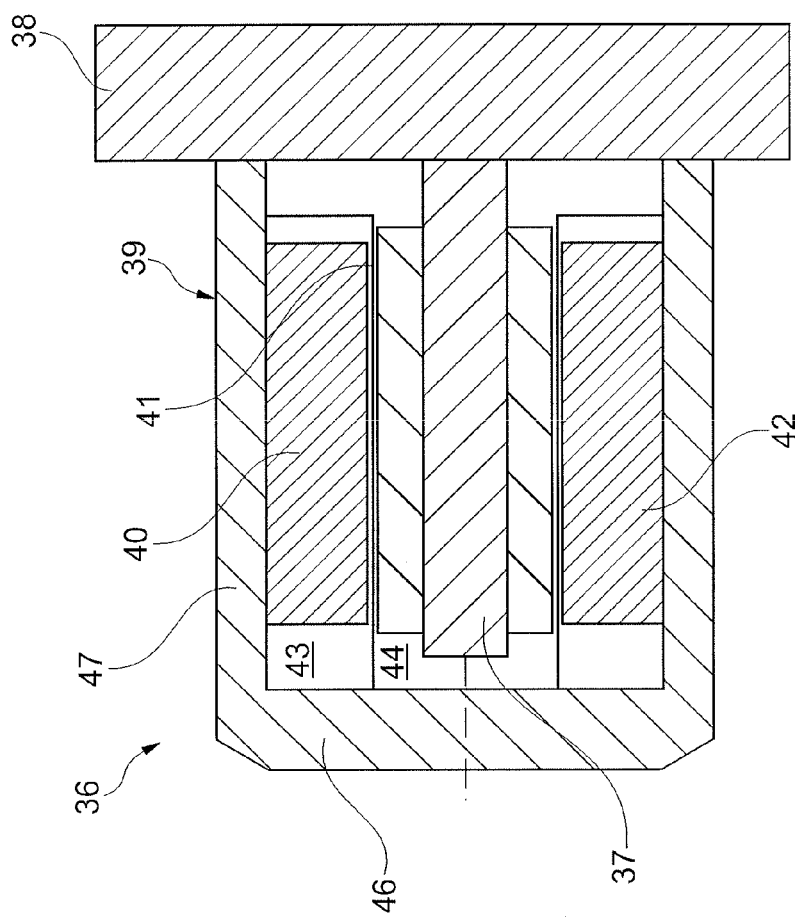

Further advantages and advantageous embodiments of the generator in accordance with the invention and of the accessory gearbox in accordance with the invention become apparent from the patent Claims and the exemplary embodiments described in principle in the following with reference to the accompanying drawing. In the drawing, FIG. 1 shows a highly schematized longitudinal sectional view of a jet engine featuring an accessory gearbox arranged substantially in the radial direction outside a bypass duct of the jet engine, the accessory gearbox being provided with a generator arranged in the area of an intermediate casing of the jet engine, FIG. 2 shows a highly schematized longitudinal sectional view of the jet engine as per FIG. 1 with an accessory gearbox substantially arranged in the area of the intermediate casing of the jet engine, with a generator being provided in the area of a drive shaft of the accessory gearbox, FIG. 3 shows a representation of a jet engine corresponding to FIG. 2 with an accessory gearbox substantially arranged in the area of the intermediate casing of the jet engine, with a generator being provided at an alternative position of the drive shaft of the accessory gearbox, FIG. 4 shows a simplified representation of an area of the generator arranged on a shaft of the accessory gearbox as per FIGS. 1 to 3 with a separator element separating a stator area from a rotor area, FIG. 5 shows a simplified sectional representation of a cutout of the generator as per FIG. 4 with an adjacent casing, with a fastening device for fixing a casing of the generator to the adjacent casing being illustrated, FIG. 6 shows a cross-sectional view through an axially central area of the generator as per FIG. 4, with a splitting of the generator being shown in the circumferential direction, and FIG. 7 shows a simplified representation of an alternatively designed generator arranged on a shaft of the accessory gearbox, with the shaft featuring an end area.

Figure 2:
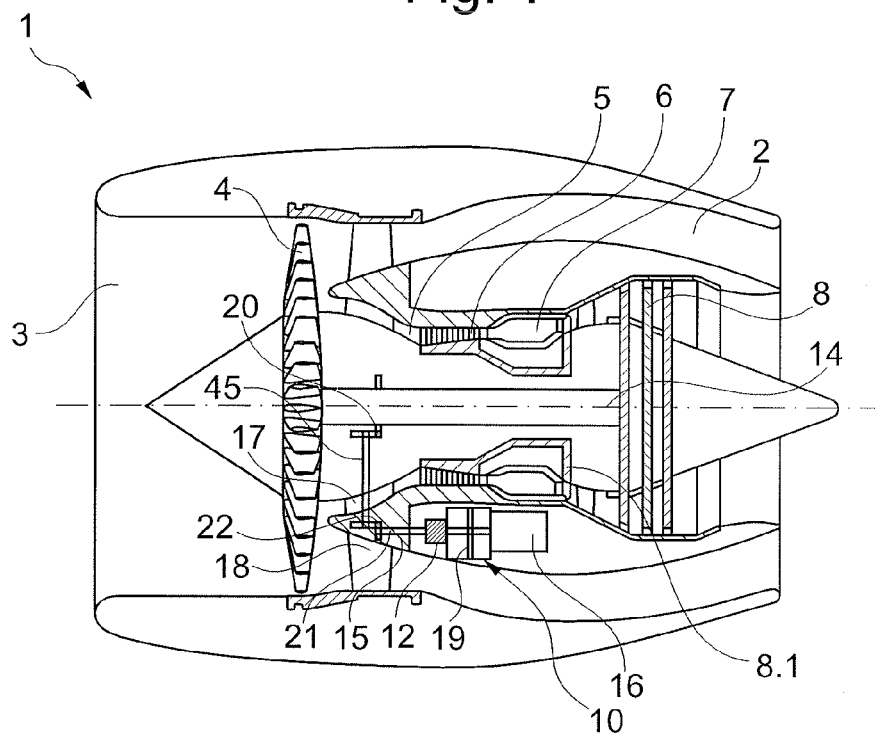
Figure 3:
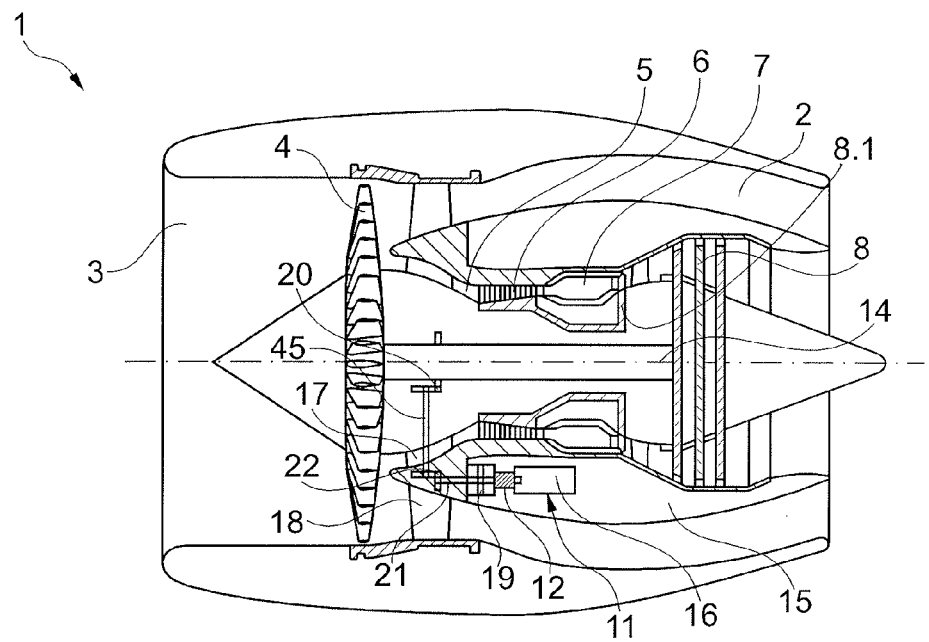

FIGS. 1 to 3 show a jet engine 1 in a longitudinal sectional view in each case. The jet engine 1 is designed with a bypass duct 2 and an intake area 3, where a fan 4 adjoins downstream the intake area 3 in a manner known per se. Again downstream of the fan 4, the fluid flow in the jet engine 1 splits into a bypass flow and a core flow, with the bypass flow flowing through the bypass duct 2 and the core flow into an engine core 5 which is in turn designed in a manner known per se with a compressor device 6, a burner 7, a low-pressure turbine 8 intended for powering the fan 4 and a high-pressure turbine 8.1 intended for powering the compressor device 6.

FIGS. 1 to 3 furthermore each show schematically illustrated accessory gearboxes 9, 10, 11 which differ from one another in their design and their arrangement. The accessory gearbox 9 shown in FIG. 1 is arranged substantially radially outside the bypass duct 2 and includes a drive shaft 13 which drives the accessory gearbox shafts in the manner of a side gearbox and via which the accessory gearbox 9 is connected to a central engine shaft 14. Accessory gearbox shafts drivable by gear pairings 19 can be driven by means of the drive shaft 13, on which shafts are arranged various secondary units 16 such as a fuel pump, a hydraulic pump, a bleed unit or a pneumatic starter.

For linking the drive shaft 13 of the accessory gearbox 9 to the engine shaft 14, a bevel gearing 20 is provided in this case, via which the drive shaft 13 is linked in this case to a high-pressure shaft of the engine shaft 14 which in the operating state of the jet engine 1 rotates at a higher speed than a low-pressure shaft arranged coaxially thereto and to which the fan 4 is linked.

The drive shaft 13 is designed in this case in one piece and passes through a so-called inner strut 17, i.e. a strut designed with a hollow section, in a substantially radial direction from the engine shaft 14 outwards through the engine core 5 to an intermediate casing 15 arranged in the area between the engine core 5 and the bypass duct 2, and from there substantially in the radial direction through an outer strut 18 passing through the bypass duct 2 further outwards to the accessory gearbox shafts.

In an alternative embodiment, the drive shaft 13 of the accessory gearbox 9 can also be designed in several parts, with at least one auxiliary shaft, where the auxiliary shaft can for example be coupled to the engine shaft 14 and interacts in the area of the intermediate casing 15 with the drive shaft 13.

In the embodiment shown in FIG. 2, the accessory gearbox 10 with the accessory gearbox shafts and the secondary units 16 is arranged substantially in the area of the intermediate casing 15, where a drive shaft 21 of the accessory gearbox 10 extending substantially in the axial direction is in this case in operative connection to an auxiliary shaft 45 via a bevel gearing 22. The auxiliary shaft 21 passes, starting from the drive shaft 21 in the area of the intermediate casing 15, through the inner strut 17 substantially in the radial direction and is coupled at its end facing away from the drive shaft 21 to the engine shaft 14 by a bevel gearing 20.

The exemplary embodiment shown in FIG. 3 corresponds substantially to the embodiment shown in FIG. 2 and differs from the latter only in the arrangement of a generator 12.

The generator 12 of the accessory gearbox 9, 10, 11 can in principle be arranged on every shaft of the accessory gearbox 9, 10, 11, where the embodiments shown in FIGS. 1 to 3 are only described as examples for a large number of further possibilities. In all the designs shown in FIGS. 1 to 3, the generator 12 is arranged in the area of the intermediate casing 15, where the generator 12 for example in the exemplary embodiment shown in FIG. 1 can also be arranged in the radial direction outside the bypass duct 2 or in the area of the struts 17, 18.

In the exemplary embodiment shown in FIG. 1, the generator 12 is arranged on the drive shaft 13, extending in the radial direction, of the accessory gearbox 9 in the area of the intermediate casing 15. In both the embodiment shown in FIG. 2 and the embodiment shown in FIG. 3, the generator 12 is arranged in each case on the drive shaft 21 substantially extending in the axial direction, where the generator 12 is arranged, when viewed in the power flow from the engine shaft 14, in the exemplary embodiment shown in FIG. 2 in front of the accessory gearbox shafts with the secondary units 16 and in the exemplary embodiment shown in FIG. 3 behind the accessory gearbox shafts with the secondary units 16. Particularly in generators 12 of large dimensions which generate high mechanical outputs, the arrangement of the generator 12 in front of the accessory gearbox shafts with the secondary units 16 is advantageous, since subsequent accessory gearbox shafts can be designed in a simpler way.

In FIGS. 4 and 6, the generator 12 is shown in more detail in simplified representations. A rotor 23 of the generator 12 is fixed non-rotatably on the drive shaft 13 of the accessory gearbox 9 by a fixing device 24 shown in more detail in FIG. 6 and which in this case is designed as a tongue and groove connection so that the rotor 23 is co-rotated by the drive shaft 13 during a rotary movement of the latter. A stator 25 of the generator 12 is firmly connected to a casing 26 of the generator 12, so that during a rotation of the drive shaft 13 the rotor 23 rotates relative to the stator 25.

A separator element 29 representing a casing device is arranged between a rotor area 27 receiving the rotor 23 and a stator area 28 receiving the stator 25, by which element the stator 25 is encapsulated from the rotor 23. The separator element 29 is made from a non-magnetic material, so that the functioning of the generator 12 is not impaired by the separator element 29. The separator element 29 is connected in this case by fastening elements, not shown in more detail and for example designed as bolts, pins or the like, to a casing 30 of the drive shaft 13 adjacent to the casing 26 of the generator 12.

Since the separator element 29 does not represent a structural component, a thickness of the separator element 29 can be designed very small depending on the selected material. A gap between the rotor 23 and the stator 25 is as a result very narrow and only very minor losses are caused by the separator element 29.

The generator 12 has a cooling device 50, shown schematically in FIG. 4, which supplies a cooling medium, in particular oil to the rotor area 27 representing a wet area. The cooling medium removes thermal energy generated in the area of the stator 25 from the latter when the jet engine 1 is in the operating state. Since the coolant comes very close to the stator area 28 representing a dry area, the energy input by the coolant is very effective. In addition, corrosion of the rotor 23 is advantageously slowed down or prevented by the coolant.

To remove the generator 12 from the drive shaft 13 in a simple manner, for example for maintenance or repair work, the casing 26 of the generator 12 and the stator 25 in the circumferential direction are in this case designed as two parts or two shells, where the two parts 31, 32 have on the one hand a hinged connection designed as a hinge 33 and on the other hand a locking device 34, so that the two parts 31, 32 of the generator 12, after loosening of fastening elements designed for example as screws in the area of flanges of the locking device 34 each assigned to a part 31, 32 of the generator 12, can be detached from the drive shaft 13.

The separator element 29 and if necessary the rotor 23, which unlike the other components of the generator 12 is not very prone to faults, are in this case not detachable from the drive shaft 13. In an alternative embodiment of the invention, they can also be split in the circumferential direction, and be integral parts of the two parts 31, 32 and hence detachable from the drive shaft 13.

Sealing elements can be provided in the area of the locking device 34 and the hinged connection.

To strengthen a link of the generator 12 to the drive shaft 13 additionally to the sleeve-like solution with the hinged and locking device 33, 34, a fastening device 35 as shown in FIG. 5 and illustrated in simplified form can be provided in an area of the casing 26 of the generator 12 adjoining the casing 30 of the drive shaft 13 in the axial direction, alternatively or additionally to the hinged and locking device 33, 34, with said fastening device being designed in particular as a quick-action lock in the form of a so-called V-band clip. A fastening device 35 of this type can be provided in both axial rim areas of the generator 12 for fixing to the casing 30 of the drive shaft 13.

To prevent rotation of the casing 26 of the generator 12 relative to the casing 30 of the drive shaft 12, a pin, a bolt or the like can be arranged in the area of flanges inside which the V-band clip 35 is arranged.

With an alternative arrangement of the generator on a shaft, the fastening device can be provided for fixing of the casing of the generator on a component adjacent to the casing of the generator in the respective application.

Unlike the generator 12 shown in FIGS. 4 and 6, which is arranged on the continuous drive shaft 13 in the area of the generator 12, an alternative generator 36 is shown in FIG. 7, which can be arranged in the region of an end area of a shaft 37.

The generator 36 has a casing 39 linked in this case to a casing 38 of the accessory gearbox 9, and is designed with a stator 40, a separator element 41 and a rotor 42, where the separator element 41 separates a stator area 43 receiving the stator 40 from a rotor area 44 receiving the rotor 42. The separator element 41 is designed substantially L-shaped in the sectional view and is connected on the one hand to a part 46 of the casing 39 of the generator extending in the radial direction and on the other hand to a part 47 of the casing 39 of the generator 36 extending in the axial direction of the shaft 37. The separator element 41 is designed in terms of its material and fastening in a similar way to the separator element 29 described in FIGS. 4 and 6.

The casing 39 which laterally passes around the end area of the shaft 37, the stator 40 and the separator element 41 can be detached from the shaft 37 in the axial direction, for example for maintenance or repair work, through an opening of a fastening device linking the generator 36 to the casing 38 of the accessory gearbox 9 and not shown in more detail. Alternatively to this, the rotor 42 can also be detached from the shaft 37.

LIST OF REFERENCE NUMERALS

1 Jet engine
2 Bypass duct
3 Intake area
4 Fan
5 Engine core
6 Compressor device
7 Burner
8 Low-pressure turbine
8.1 High-pressure turbine
9, 10, 11 Accessory gearbox
12 Generator
13 Drive shaft
14 Engine shaft
15 Intermediate casing
16 Secondary unit
17 Inner strut
18 Outer strut
19 Gear pairing
20 Bevel gearing
21 Drive shaft
22 Bevel gearing
23 Rotor
24 Tongue and groove connection
25 Stator
26 Casing of generator
27 Rotor area
28 Stator area
29 Separator element
30 Casing of drive shaft
31, 32 Part of generator
33 Hinge
34 Locking device
35 Fastening device
36 Generator
37 Shaft
38 Casing of accessory gearbox
39 Casing of generator
40 Stator
41 Separator element
42 Rotor
43 Stator area
44 Rotor area
45 Auxiliary shaft

What is claimed is:

1. A generator, comprising:
    a casing having a stator area and a rotor area;
    a stator positioned in a stator area;
    a rotor positioned in the rotor area and configured for coupling to a shaft of an accessory gearbox of an engine, the rotor being rotatably mounted relative to the stator;
    a separator element extending between the stator and the rotor separating the stator area the rotor area in a fluid-tight manner;
    a cooling unit supplying the rotor area with a liquid cooling medium, such that the rotor is in direct contact with the liquid cooling medium;
    the separator element isolating the liquid cooling medium supplied to the rotor area from the stator area to maintain the stator area as a dry area.

2. The generator of claim 1, wherein the separator element is made from a non-magnetic material.

3. The generator of claim 1, wherein the separator element is a separate component which can be connected via fastening elements to a casing of the generator.

4. The generator of claim 1, wherein the separator element is integral with a casing of the generator.

5. The generator of claim 1, wherein the generator and the stator are formed by two parts in a circumferential direction.

6. The generator of claim 5, and further comprising a hinged connection coupling first sides of the two parts of the generator to one another and a locking connection coupling second sides of the two parts of the generator to one another.

7. The generator of claim 5, and further comprising a fastening device gripping around the casing of the generator on a circumferential side fixing the parts of the generator on a shaft of the accessory gearbox.

8. The generator of claim 1, wherein the generator is constructed and arranged for arrangement in an area of an end section of a shaft of the accessory gearbox of the engine, where the end section of the shaft is arranged completely inside a casing of the generator.

9. The generator of claim 1, wherein the generator is constructed and arranged for arrangement on a continuous shaft of the accessory gearbox of the engine in an area of the generator.

10. An accessory gearbox arrangement comprising:
    a drive shaft operatively connectable to a main shaft of an engine;
    a generator shaft operatively connected to the drive shaft;

a generator arranged on the generator shaft, the generator comprising:
  a casing having a stator area and a rotor area;
  a stator positioned in a stator area;
  a rotor positioned in the rotor area and configured for coupling to a shaft of an accessory gearbox of an engine, the rotor being rotatably mounted relative to the stator;
  a separator element extending between the stator and the rotor separating the stator area from the rotor area in a fluid-tight manner;
  a cooling unit supplying the rotor area with a liquid cooling medium, such that the rotor is in direct contact with the liquid cooling medium;
  the separator element isolating the cooling medium supplied to the rotor area from the stator area to maintain the stator area as a dry area.

11. The accessory gearbox arrangement of claim 10, wherein a casing of the accessory gearbox forms the separator element of the generator.

12. The accessory gearbox arrangement of claim 10, wherein the generate is arranged on a shaft of the accessory gearbox in an area of an intermediate casing of the engine.

13. The accessory gearbox arrangement of claim 10, wherein the generator is arranged on the generator shaft in an area of a casing arranged in a radial direction outside a bypass duct.

* * * * *